United States Patent [19]

Linares

[11] 4,139,801

[45] Feb. 13, 1979

[54] AUTOMATIC AUTOMOBILE LIGHT CONTROL SYSTEM

[76] Inventor: Raul F. Linares, 1101 NW. 19 Ave., Miami, Fla. 33125

[21] Appl. No.: 762,816

[22] Filed: Jan. 26, 1977

[51] Int. Cl.² .............................................. B60Q 1/02
[52] U.S. Cl. ................................ 315/83; 307/10 LS; 315/82; 315/155; 315/159
[58] Field of Search ................... 315/82, 83, 156, 159, 315/155; 307/10 LS

[56] References Cited

U.S. PATENT DOCUMENTS

| | | | |
|---|---|---|---|
| 3,283,161 | 11/1966 | Ubukata et al. | 315/83 X |
| 3,769,519 | 10/1973 | Adamian | 315/83 |
| 3,828,220 | 8/1974 | Moore et al. | 315/156 |
| 3,840,777 | 10/1974 | Brock et al. | 315/159 |
| 3,879,617 | 4/1975 | Faller | 307/10 LS |
| 4,015,137 | 3/1977 | Kniesly et al. | 307/10 LS |

*Primary Examiner*—Saxfield Chatmon, Jr.

*Attorney, Agent, or Firm*—Cushman, Darby & Cushman

[57] ABSTRACT

A system for automatically controlling actuation of various parts of an automobile in accordance with various sensed conditions. Four photocells are mounted, preferably about the periphery of the courtesy light inside the automobile on the roof, to receive ambient light from four orthagonal directions and are connected to a logic circuit to produce a signal causing the automobile's lamps to be turned off only when all four of the photocells are sensing daytime conditions and to be turned on, after a short delay, when any of the photocells senses nighttime conditions which persist during the delay. A water cell is mounted at the base of the windshield so that during a rain shower the water cell will become conductive. The water cell is also connected to the logic circuit and to a motor driver circuit, which signal produced by the conductive water cell causing the lights and windshield wipers to be actuated as long as the shower continues.

17 Claims, 6 Drawing Figures

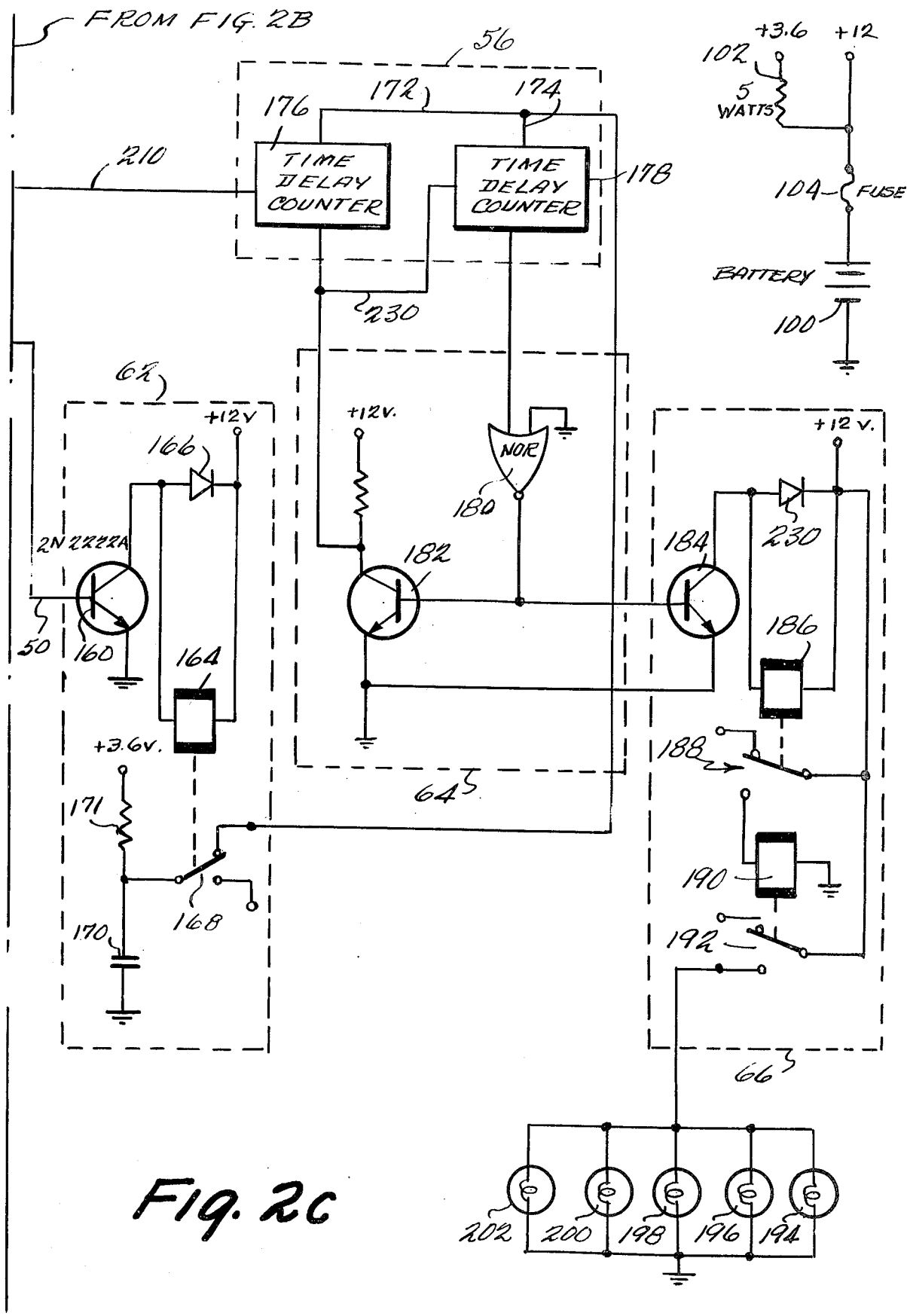

AUTOMATIC AUTOMOBILE LIGHT CONTROL SYSTEM

BRIEF DESCRIPTION OF THE PRIOR ART AND SUMMARY OF THE INVENTION

The invention relates to an improved circuit for automatically turning the lights of a motor vehicle on and off in accordance with ambient light levels and to turn the lights and windshield wipers on during showers. Also, if the car is provided with power windows and a convertible roof, the windows and roof can be raised.

Many different arrangements have been proposed in the past for automatically controlling various items on a motor vehicle, particularly the head lights. Often a driver who is driving early in the morning will forget to turn his lights off after dawn and occasionally will leave the lights on after leaving the vehicle, thus discharging the battery. Similarly, drivers often forget to turn their lights on properly at dusk or during a rain shower.

The U.S. Pat. Nos. to Lohr et al, 2,944,188, Schick, 3,319,116, and Ubukata 3,283,161, describe representative automatic light control systems for automobiles of the prior art.

All of these types of circuits include a photo-responsive electrical element which is mounted to detect either ambient light or the on-coming beams of another automobile. However, in many driving situations such a photo-electric element, no matter where situated on the automobile, will from time to time receive stray light reflected from buildings, signs or directly from lights of other automobiles. This light occasionally will be sufficiently intense so as to activate the circuit. However, shutting off the lights of an automobile as a result of stray light during nighttime may create a very dangerous situation leading to a severe accident. Similarly, during the daytime the photo-responsive element may from time to time be shaded, turning on the lights erroneously. This latter action, while not normally dangerous, is inconvenient.

The present invention relates to an improved circuit whereby a plurality of photo-responsive elements, each receiving light from a different direction, are used to control a unique circuit which automatically turns the lights of a motor vehicle on and off in accordance with ambient light levels and whereby a water cell, sensitive to precipitation is used to control the lights and windshield wipers, but can also control the power windows and convertible roof when applicable.

Each of the photocells, which may for example be mounted on the four sides of the courtesy lamp on the roof of an automobile, is connected to an electrical logic circuit so that an electrical signal indicating that the lamps of the vehicle should be turned off is produced only when each and every one of the photocells is producing a signal indicating daytime conditions. Thus, at night it is virtually impossible for stray light to inadvertently cause the automobile lamps to be turned off.

The circuit is further designed so that if any of the photo-responsive elements indicates a nighttime condition, the circuitry responds by turning on the lamps after a predetermined time delay. This time delay ensures that during daylight hours a brief shading of one of the photocells will not inadvertently turn the lamps on. The time delay also prevents the battery from being overloaded at the time of starting up the engine as might occur if the headlights came on immediately instead of after a short delay.

The present invention also relates to an improved circuit whereby the motor vehicle's lights and windshield wipers are automatically turned on and off in accordance with the sensing of precipitation. Further, on motor vehicles equipped with power windows and/or a convertible roof, raising the windows and roof can likewise be automatically controlled. A water cell is placed beneath that portion of the hood directly adjacent the base of the front windshield. By such placement, water from a rain shower running off the windshield would trigger the water cell causing an electrical signal to be applied to the same logic circuit discussed above and to an electrical motor drive circuit thereby turning on the vehicle's lights, windshield wipers and where applicable, raise the vehicle's windows and roof.

Many other objects and purposes of the invention will be clear from the following detailed description of the drawings.

DETAILED DESCRIPTION OF THE DRAWINGS

Figure 3:
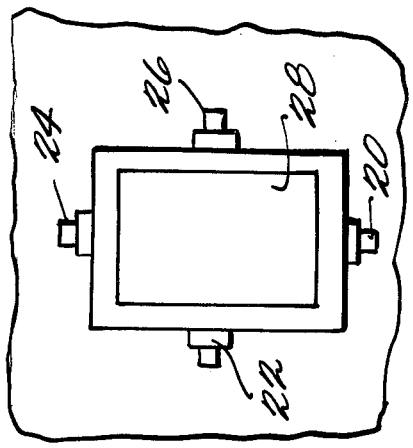
FIG. 3 shows a view of four photo-responsive elements receiving lights from four orthagonal directions and mounted about the periphery of a conventional courtesy light which is mounted on the interior roof of an automobile.
Figure 1:
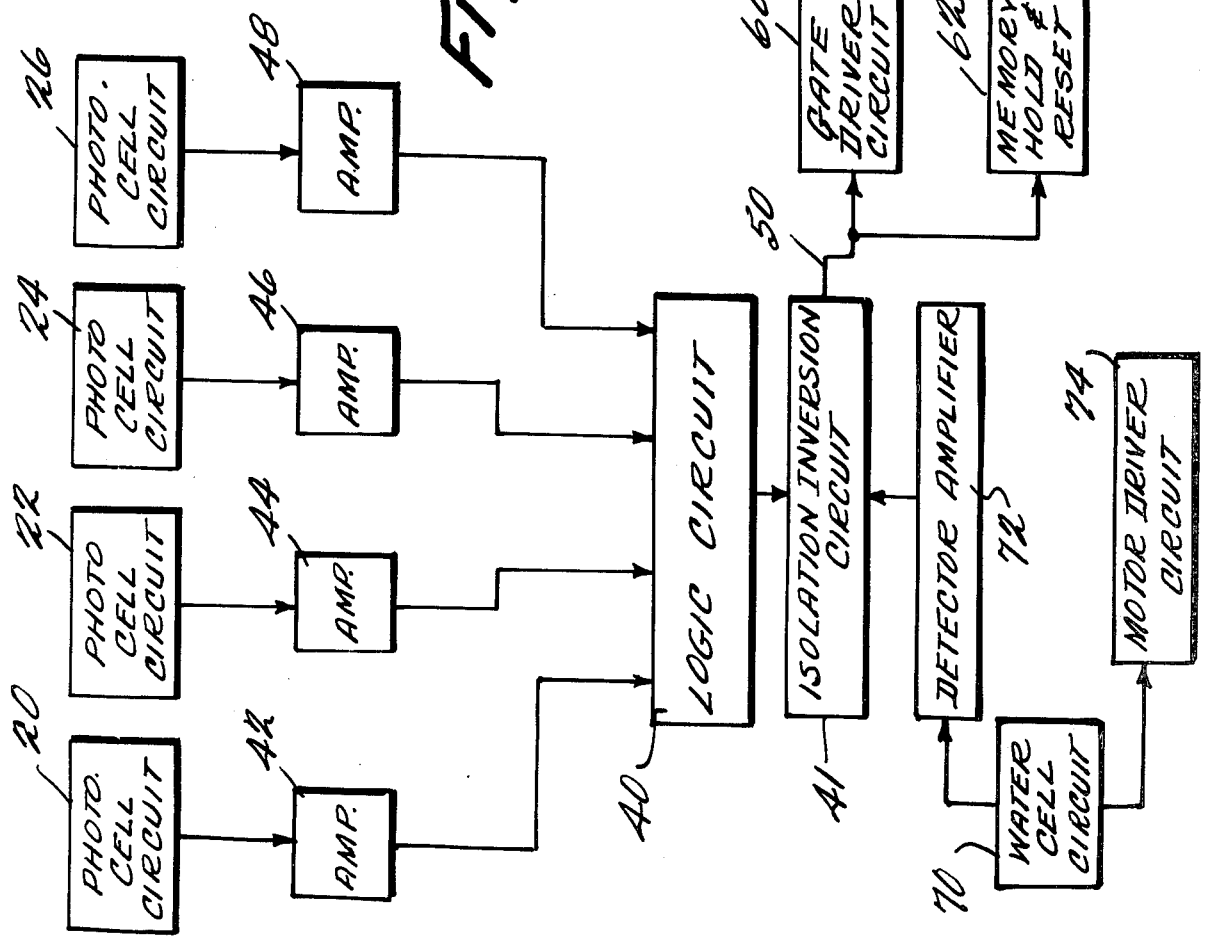
FIG. 1 shows a block diagram of the unique system and circuit of the preferred embodiment of this invention.

Reference is now made to FIG. 1 which illustrates a block diagram of the unique circuitry of this invention. Beginning with the photocell control of the lights, four photocell circuits 20, 22, 24 and 26 are mounted preferably as illustrated in FIG. 3 on the four sides of conventional courtesy light 28. Each of the photocells receive light from only one direction so that all of the directions are covered and the probability of stray light falling on each of the lamps in sufficient intensity to erroneously indicate a daytime condition is very small. Courtesy light 28 is normally mounted on the roof 30 of an automobile.

The electrical outputs of photocells circuits 20, 22, 24 and 26 are applied to logic circuit 40 via respective amplifiers 42, 44, 46 and 48. As indicated briefly above, logic circuit 40 produces an output through an isolation-/inversion circuit 41 to line 50 to turn off the lights during daytime only if each of the photocell circuits 20, 22, 24 and 26 are in agreement that a daytime condition exists. Similarly, logic circuit 40 produces an output on line 50 which turns on the automobile lights indicating that a nighttime condition occurs if any of photocell circuits 20, 22, 24 or 26 has detected a level of ambient light indicating that the lights should be illuminated.

As mentioned briefly above, it is desirable to delay for a short time turning on the automobile lights to make sure that a detected low ambient light condition is really that of nighttime and not merely a transient shading of one of the photocell circuits. This is accomplished in the embodiment illustrated in FIGS. 1 and 2 by an oscillator circuit 54 which applies a train of pulses to time delay circuits 56 whenever oscillator gate circuit 58 is activated by a signal on line 50 indicating that one of the photocells 20, 22, 24 or 26 has detected a nighttime condition. The signal on line 50 from the logic circuit 40 and the isolation/inversion circuit 41 is applied to oscillator gate 58 via a gate driver 60.

During daytime conditions, the memory hold and reset circuit 62 in accordance with the output on line 50 of logic circuit 40 applies a signal to the time delay circuits which keeps those circuits reset. When that signal is removed by the transition of the output of logic circuit 40 through the isolation/inversion circuit 41 to a condition associated with daytime, time delay circuit 56 receive the output pulses from oscillator circuit 54 until a predetermined count at which time hold circuit 64 is activated to produce an output which is applied to light driver circuits 66 which in turn cause the lamps to be illuminated. When the four photocells 20, 22, 24 and 26 again are in agreement that a daytime condition exists, then circuit 62 resets time delay circuits 56 and immediately deactivates the hold circuit 64 so that the driver circuits 66 are in turn deactivated and the lights are doused.

The isolation/inversion circuit 41 also receives signals from the water cell circuit 70 which provides an output signal both to a detector amplifier circuit 72 which in turn provides a signal to the isolation/inversion circuit 41. The water cell circuit 70 also provides an output signal to the motor driver circuit generally indicated in FIG. 1 at 74.

Figure 4:
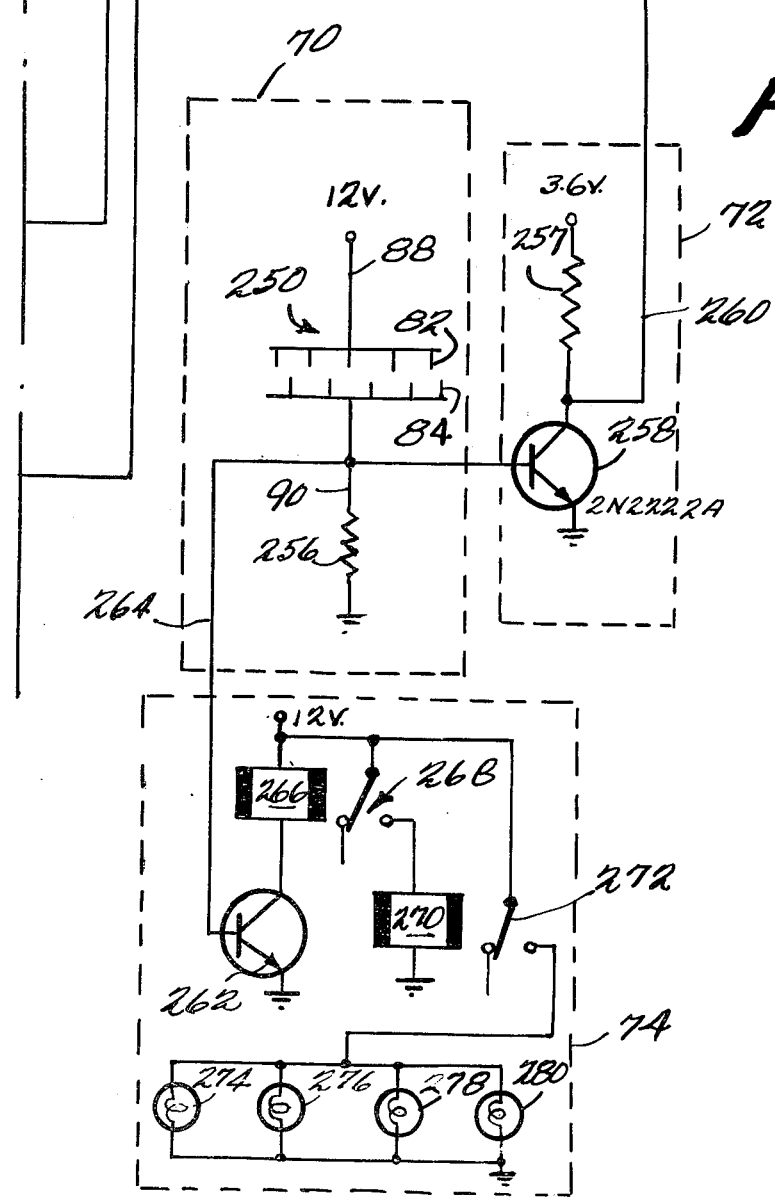
FIG. 4 shows a diagrammatic plan view of the water cell sensor.
Figure 4:
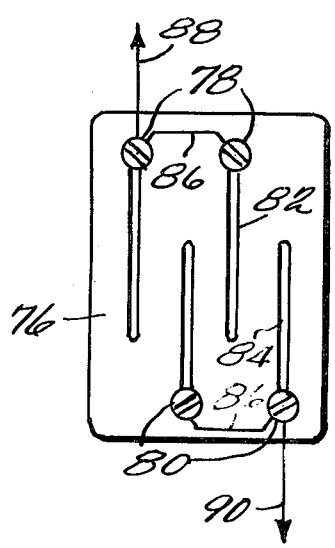

As indicated previously, the water cell circuit 70 would be placed under the hood of the car but close enough to the base of the front windshield so as to be in position to have drops of water collected thereon from a shower or heavy rain. The positioning should be such that very light rain fall such as a light sprinkle would not produce sufficient water to trigger the device. The contact block of the water cell circuit 70 could be as is shown in FIG. 4 which shows a block 76 made of any convenient non-corrosive material such as any thermoplastic material. Two rows of screws indicated at 78 and 80 are provided down each of two sides of the top surface of the block 76 with the screws 78 and 80 preferably being of a plastic material. Extending away from each of the sets of screws 78 and 80 are strips of a non-corrosive conductive material, respectively indicated at 82 and 84, and it should be noted that the length of each of these strips extends at least beyond the mid-point of the block 76. Each of the strips extending away from the screws along the side of the block are connected together by connector wires 86 with the strips 82 being connected to the battery by means of line 88 while the strips 84 are connected by means of a line 90 to a resistor 256 as will be described hereinafter. The other side of the block 76 will be constructed in a like manner with the electrodes on one side of block 76 being separated from the electrodes on the opposite side of block 76, by a gap of approximately one-eighth of an inch. This one-eighth of an inch gap would allow droplets of water from a shower to collct and form a current path between the electrodes on block 76 so as to create a small current flow therethrough. That current flow will be detected by the detector amplifier circuit 72. When that current flow is detected, the detector amplifier circuit 72 will cause a suitable signal to be applied to the isolation/inversion circuit 41 to cause the actuation of the light driver circuit 66. In addition, the flow of current through water cell 70 would likewise cause the motor driver circuit 74 to be energized which automatically controls the operation of the automobile's windshield wipers, and if the automobile were provided with power windows and had a convertible roof the motor drive circuit 74 would likewise raise the windows and raise the convertible roof.

As soon as the rainshower stops, the drops of water which have collected on block 76 and caused a current flow between electrodes 82 and 84 will begin to dry due to the heat exiting from the running engine. When current flow has stopped, the detector amplifier circuit will sense the lack of current flow through water cell circuit 70 turning off the lights and likewise the motor driver circuit 74 will be deenergized so that the windshield wipers return to their previous condition.

Figure 2A:
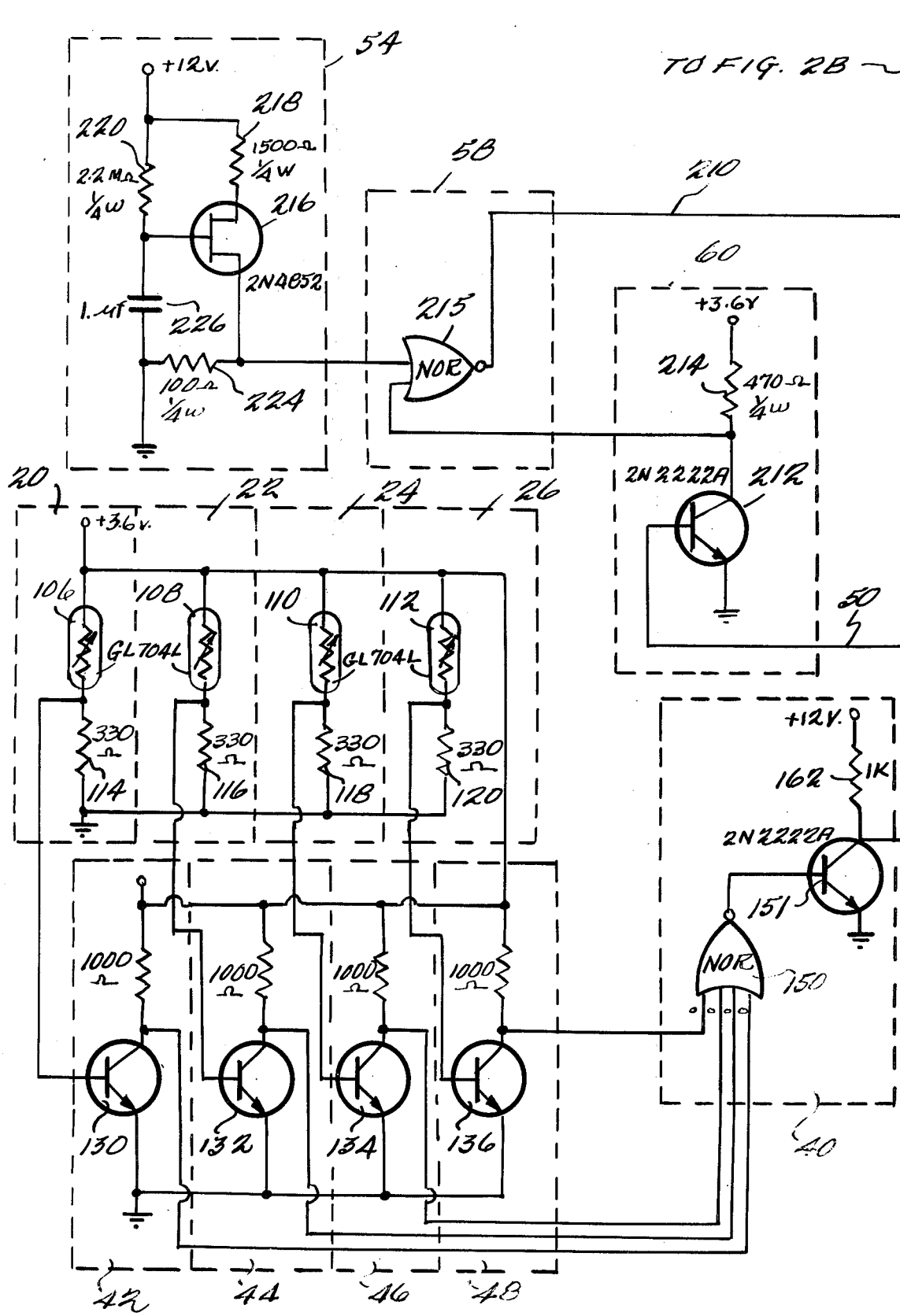
FIG. 2 shows a preferred embodiment of a detailed schematic of the circuitry of FIG. 1.
Figure 2B:
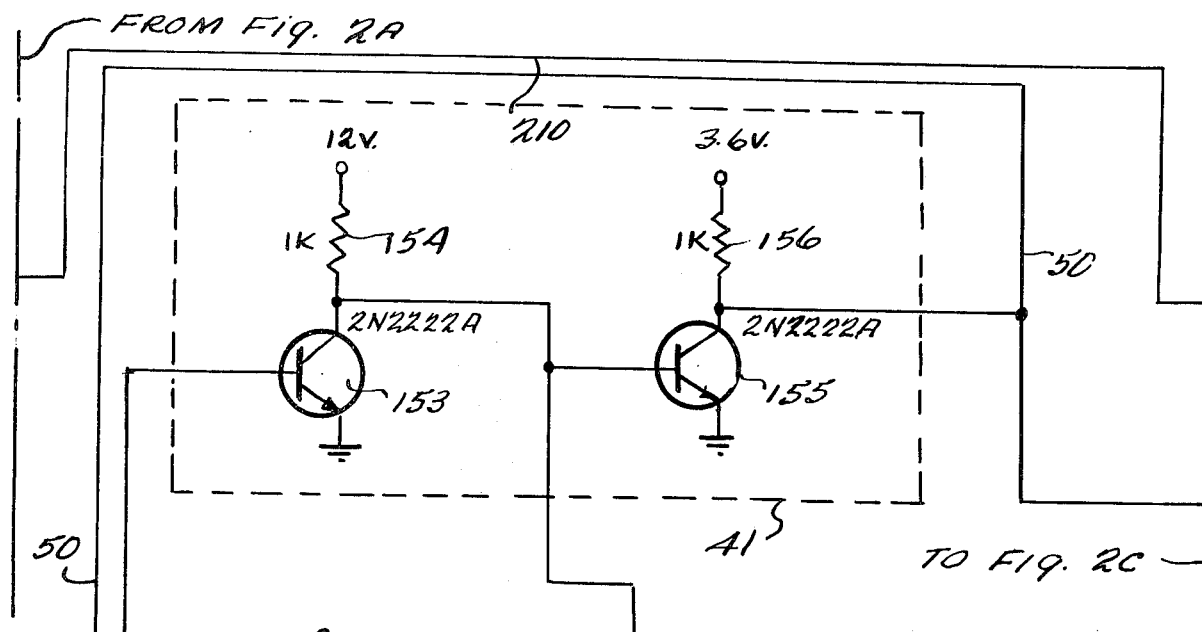

Reference is now made to FIGS. 2a, 2b and 2c which illustrate a detailed schematic of one embodiment of this invention as illustrated in block diagram in FIG. 1. The electrical energy to operate this circuit is supplied by battery 100 which supplies as illustrated both a 3.6 volt output via switch 101 which forms part of the vehicle's ignition system so that the battery is placed in circuit when the vehicle is operating, resistor 102 and a 12 volt output to power the circuitry. Fuse 104 is connected between battery 100 and the respective voltage outputs to protect the battery.

Each of the photocell circuits 20, 22, 24 and 26 includes a conventional photocell which is connected via a serially connected resistor between ground and the 3.6 volt potential provided as discussed above. In FIG. 2a, photocells 106, 108, 110 and 112 are serially connected with resistors 114, 116, 118 and 120. Transistors 130, 132, 134 and 136 are connected to the junction respectively between the photocells and resistors as indicated above so as to each shift its output condition between a high output of 0.8 volts and a low output of ground in accordance with potential at that junction. The respective resistances and photocells are chosen and adjusted such that each of transistors 130, 132, 134 and 136 is respectively conductive, providing a ground output at the collector thereof, when the associated photocell is receiving ambient light such that it is desirable to turn off the head lights, i.e., daylight conditions are detected and a low output when night conditions are detected.

Thus, when each of photocells 106, 108, 110 and 112 detects ambient light conditions associated with daylight, NOR gate 150 of logic circuit 40 receives as its inputs four logical zeros, and accordingly produces a logical 1 output which is applied to the base of transistor 151. Transistor 151 accordingly is rendered conductive so that a low voltage essentially of ground is applied to the base of transistor 153 of the isolation/inverter circuit 41 so that transistor 153 is rendered non-conductive, or more particularly shifts to its non-conductive condition so that the voltage source which will usually be a voltage of 2 or 3 volts is connected to the detector circuit 72 through resistor 154 specifically to the collector of transistor 258. This high voltage or logical 1 output is also applied to the base of transistor 155. Transistor 155, accordingly, is rendered conductive so that a low voltage essentially that of ground is applied to the base of transistor 160 of circuit 62 so that transistor 160 is rendered non-conductive, or more particularly shifts to its non-conductive condition, so that no current flows through relay coil 164 and its controlled switch 168 returns to its illustrated position. In that position, capacitor 170, which has charged to a positive potential and for example 2 volts via resistor 171, is applied to the reset inputs 172 and 174 of conventional counters 176 and 178.

The application of a positive potential to the reset inputs of counters 176 and 178 causes each of these counters to produce a high or logical 1 output at each of its respective outputs. An output of counter 178 is applied as one input to NOR gate 180 with the other input connected to ground so that NOR gate 180 accordingly now produces a low output which is applied to the bases respectively of transistors 182 and 184. These transistors accordingly are shifted or remain in their non-conductive conditions. Accordingly, current flow through coil 186 is cut off so that its controlled switch 188 returns to its illustrated position in turn cutting off the flow of current through coil 190. Switch 192, controlled by coil 190, similarly returns to its illustrated position cutting off the current path through the vehicle lamps 194, 196, 198 200, and 202 so that all of the automobile lamps are turned off. Accordingly, if each of the circuits 20, 22, 24 and 26 agree that daylight conditions exist and the lamps should be turned off, the circuitry responds immediately to douse the lamps by breaking the connection between lamps 194, 196, 198, 200 and 202 and the battery 100.

If any of photocell elements 106, 108, 110 or 112 now indicate that nighttime conditions exist and the automobile lamps should be turned on, a logical one or high signal appears at one of the inputs to NOR gate 150 as the associated amplifier 130, 132, 134 or 136 shifts to its non-conductive condition. Whenever one of the inputs to NOR gate 150 is a high or logical one, a logic 0 appears at the output thereof and accordingly causes transistor 151 to return to its non-conductive position. This causes a high voltage or a logical 1 signal to be applied to the base of transistor 153 via resistor 162 so that transistor 153 is rendered conductive. With transistor 153 in its conductive condition, the collector-emitter current path is established which removes the high voltage from the base of transistor 155. With the draining of the high voltage from the base of transistor 155, transistor 155 is rendered non-conductive or caused to shift into a non-conductive condition. This in turn causes a high voltage to be applied to the base of transistor 160 via resistor 156. Transistor 160 accordingly is rendered conductive to permit current flow through coil 164 which shifts its controlled switch 168 away from the illustrated position, breaking the electrical connection between capacitor 170 and the reset inputs 172 and 174 of counters 176 and 178, respectively. Counters 176 and 178 are now operative and will count input pulses received on line 210.

The signal appearing at the collector of transistor 155 is also applied to the base of transistor 212 which together with resistor 214 forms the gate driver circuit 60. Accordingly, when a high signal appears at the collector of transistor 155, transistor 212 is caused to assume its conductive condition which in turn applies a ground or 0 signal to NOR gate 215 which enables that NOR gate to pass the pulse train produced by conventional oscillator circuit 54.

Oscillator circuit 54 is a conventional unijunction oscillator including a unijunction transistor 216, resistors 218, 220 and 224 and a capacitor 226.

The pulse train continuously produced by oscillator 54 is now passed by NOR gate 215 which comprises the oscillator gate circuit 58 and is applied to the input to counter 176 which counts to a predetermined count, for example, 10 and applies a pulse on line 230 to the input to counter 178. After counter 178 has counted to a predetermined count, for example, 2, the output of counter 178, which is connected to an input to NOR gate 180, shifts to a logic 0 so that NOR gate 180 produces a logical 1 output which causes transistor 182 to shift to its conductive condition, applying a low input of ground to line 230 to freeze the output of counter 178. The output of NOR gate 180 is also applied to the base of transistor 184 which similarly shifts to its conductive condition, permitting current to flow through coil 186 which shifts its controlled switch away from the illustrated position and permits current to flow through relay coil 190. Diode 230 is connected in parallel with coil 186 to protect transistor 184 from transient currents.

Coil 190 now responds by shifting its controlled switch 192 away from the illustrated position and connecting lamps 194, 196, 198, 200 and 202 to the 12 volt output of battery 100 so that the lamps are illuminated.

The circuit continues functioning automatically as described to turn on the lamps whenever any one of the photocell circuits indicates, for longer than a predetermined time, that nighttime conditions exist and to automatically turn off the lights immediately when all of the photocell circuits agree that daytime conditions exist.

Returning again to FIGS. 2a, 2b and 2c, the water cell conductor generally indicated at 250 is comprised of a base 76 on which the contacts 82 and 84 are placed. One set of contacts as, for example, 82 are connected by means of a line 88 to the battery 100 whereas the other contacts as, for example, 84 are connected by means of a line 90 to grounding resistor 256. Both the detector amplifier circuit 72 and the motor driver circuit 74 are connected to the junction point between the water cell 250 and the resistor 256. When water closes the circuit between the contacts of water cell 250, a current will be caused to flow from ground through resistor 256 and in so doing develops a signal across resistor 256 which is applied to the base of transistor 258 so that transistor 258 is rendered conductive. Prior to transistor 258 becoming conductive, a high voltage or logic level 1 output is applied to the base of transistor 155 through resistor 154 assuming daylight conditions. However, transistor 258 is connected by line 260 to the base of transistor 155, so that with transistor 258 switching into a conductive condition, this logic level 1 or high voltage state is removed and a low voltage is now applied to the base of transistor 155 through resistor 257 thereby shifting transistor 155 into a non-conductive condition. When transistor 155 becomes non-conductive, a high output voltage is applied to line 50 through resistor 156 to operate relay coil 164 as would happen if the photocell circuits 20 through 26 had determined that a nighttime condition existed so that the light driver circuit 66 is energized as explained hereinbefore. Thus, the logic circuit 40 is bypassed so that the car's lights can also be controlled by the water cell circuit 70 whenever the detector amplifier circuit 72 detects a current flow within the water cell circuit 70.

As indicated previously, the motor driver circuit 74 is also connected to the water cell circuit 70 at the junction between the water cell 250 and resistor 256. Thus, current flow in the water cell circuit 70 will likewise place a high voltage or logic level 1 output on the base of transistor 262 by means of line 264. Transistor 262 accordingly is rendered conductive and permits current flow through coil 266 which shifts its controlled switch 268 away from the illustrated deenergized position to energize coil 270. Energization of coil 270 will cause its control lead switch 272 to switch away from its illustrated deenergized position so as to energize the windshield wiper motor 274, the window motors 276 and 278 and the roof motor 280. The coil 266 can be part of a small 220 series relay whereas coil 270 is preferably part of a heavy-duty relay system. It should be well understood, however, that if the vehicle is not provided with powered windows nor a convertible roof, switch 272 would preferably serve to energize only the windshield wiper motor 274.

As soon as the rainshower stopped, the water within the water cell 250 will be vaporized due to the heat of the engine so that within a short period of time of about one minute water will no longer remain collected in the water cell 250 terminating current flow within the water cell circuit 70. This would remove the signal developed across resistor 256 from the base of transistor 258 so that transistor 258 will again be shifted into a non-conductive condition. This would serve to again place a high voltage on the base of transistor 155 via line 260 with the output on line 50 again being shifted to a low voltage condition. This returns the entire circuit back to its daytime condition and deenergizes the circuit controlling actuation of the light driver circuit 66 thereby turning off the car's lights. Likewise, the high voltage condition on the base of transistor 262 would be removed returning that signal to a low voltage or logic level 0 which would render transistor 262 non-conductive. This would serve to terminate current flow through coil 266 causing switch 268 to return to the position as shown which likewise terminates current flow through coil 270. Once coil 270 is deenergized, contacts 272 would return from the position as shown and the motors 274, 276, 278 and 280 are turned off.

It will now be clear that there has been provided herein a device which accomplished the objectives heretofore set forth. While the invention has been disclosed in a preferred form, it is to be understood that the specific embodiment thereof as described and illustrated herein is not to be considered in a limited sense as there may be other forms or modifications of the present invention which should also be construed as coming within the scope of the appended claims.

What is claimed is:

1. A system for automatically turning automobile lamps on and off in accordance with ambient light comprising:
   a plurality of photo-responsive means each mounted for receiving ambient light from a different direction and each producing a daytime signal indicating daytime conditions and a nighttime signal indicating nighttime conditions,
   logic means connected to said photo-responsive means for producing a first output signal when all of said photo-responsive means are producing said daytime signal and producing a second output signal when at least one of said photo-responsive means is producing said nighttime signal, and
   circuit means connected to said logic means and said lamps for connecting an electrical potential to said lamps to cause illumination when said logic means is producing said nighttime signal and disconnecting said electrical potential from said lamps when said logic means is producing said daytime signal wherein said circuit means includes delay means for connecting said lamps after a given delay one if said nighttime signal continues during said delay, said delay means including an oscillator circuit, counter circuit means for producing an output signal upon counting a predetermined count, gate means connected to said logic means and connecting said oscillator circuit to said counter circuit for passing pulses from said oscillator circuit to said counter circuit means, and further logic means connecting the output of said counter means to said lamps for causing said lamps to be connected to said potential when said counter produces said output signal.

2. A system as in claim 1, wherein said circuit means further includes reset means connected to said logic means and responsive to said daytime signal for resetting said counter circuit means.

3. A system as in claim 2, wherein said resetting means includes a capacitor, means for connecting said capacitor to an electrical potential, relay means having a controlled switch, means connecting said capacitor to reset inputs to said counter means via said controlled switch so as to apply the voltage across the charged capacitor to said reset inputs when said controlled switch is in a first position and disconnecting said capacitor when said controlled switch is in a second position and switching means connected to said logic means and said relay means for causing said relay means to shift said controlled switch into said first position when said logic means produces said daytime signal and into said second position when said logic means produces said nighttime signal.

4. A system as in claim 3, wherein said switching means includes a transistor serially connected with said relay means and a diode connected in parallel with said relay means.

5. A system as in claim 3, wherein said oscillator circuit includes a unijunction oscillator and said gate means includes a NOR gate.

6. A system as in claim 3, wherein said photo-responsive means each include a photocell, a resistor serially connected to each said photocell, means connecting each said photocell to an electrical potential, a transistor with its base connected to the junction of said resistor and photocell and producing said daytime signal when the ambient light on the associated photocell is greater than a predetermined level and said nighttime signal when the ambient light is less than said predetermined level, and wherein said logic means includes a NOR gate connected to said transistors for receiving said daytime and nighttime signals.

7. A system as in claim 3, wherein said counter means includes first and second counters, and means connecting the output of the first counter to the input of the second counter and said circuit means further includes further gate means housing an input connected to the output of said second counter for shifting from a first to second output signal whenever the count in said second counter reaches a predetermined count, first switching means connected to the output of said further gate means and to the input of said second counter for shifting to an output condition when said further gate means shifts to said second output signal so as to prevent further counting by said second counter and freeze the count therein until said second counter is reset, second switching means connected to the output of said further gate means for shifting to a given output condition when said gate means shifts to said second output signal, further relay means having a controlled switch, said further relay means shifting its controlled switch to a given position when said second switching means shifts to said given output condition and means connecting said lamps to an electrical potential via said controlled switch when said controlled switch is in said given position.

8. A system as in claim 7, wherein said further gate means includes a NOR gate and said switching means include a transistor.

9. A system as in claim 1, wherein the number of said photo-responsive means is four and further including means for mounting each of said photo-responsive means on a different side of an automobile courtesy light on the inside roof of the automobile.

10. A system for automatically turning automobile lamps and the windshield wiper drive motor on and off in accordance with the detection of precipitation comprising:

a plurality of photo-responsive means each mounted for receiving ambient light from a different direction and each producing a daytime signal indicating daytime conditions and a nighttime signal indicating nighttime conditions, logic means connected to said photo-responsive means for producing a first output signal when all of said photo-responsive means are producing said daytime signal and producing a second output signal when at least one of said photo-responsive means is producing said nighttime signal, and circuit means connected to said logic means and said lamps for connecting an electrical potential to said lamps to cause illumination when said logic means is producing said second output signal and disconnecting said electrical potential from said lamps when said logic means is producing said first output signal, a water detection means mounted adjacent the windshield for receiving water flowing down the windshield for producing a signal indicating the presence of water, detector circuit means connected between said circuit means and said water detection means for producing a detector signal when said water detection means is producing the water indicating signal and for applying said detector signal to said circuit means, said circuit means connecting an electrical potential to said lamps to cause lumination when said detector circuit means is producing said detector signal, motor driver circuit means connected to said water detection means for connecting an electrical potential to an accessory drive motor to cause the operation of said accessory when said water detection means is producing the water indicating signal, wherein said water detection means includes a water cell and a resistor, said water cell comprising a non-corrosive body structure having first and second sets of contacts mounted thereon in an alternating, spaced condition, said first contacts being connected to an electrical potential, said second set of contacts connected to said resistor so that water collecting between said first and second sets of contacts will cause a current flow across said resistor.

11. A system as in claim 10, wherein said detector circuit means is connected to said water detection means at the junction between said water cell and said resistor, said detector circuit means includes a switching means for shifting to an output condition when a current flow is developed across said resistor.

12. A system as in claim 10, wherein said switching means includes a transistor.

13. A system as in claim 10, wherein said motor driver circuit means includes motor switching means connected to said water detection means at the junction between said water cell and said resistor for shifting to an output condition when said water detection means is producing said indicating signal, at least first relay means having a controlled switch, said at least first relay means shifting its controlled switch to a given position when said motor switching means shifts to said output condition and connecting means for connecting said accessory drive motor to an electrical potential via said controlled switch when said controlled switch is in said given position.

14. A system as in claim 13, wherein said motor switching means includes a transistor.

15. A system as in claim 14, wherein said accessory comprises the vehicle's windshield wiper.

16. A system as in claim 14, wherein said accessory comprises the vehicle's convertible roof.

17. A system as in claim 14, wherein said accessory comprises the vehicle's power windows.

* * * * *